United States Patent [19]

Mercer et al.

[11] 4,265,687
[45] May 5, 1981

[54] ULTRASONIC TAPE TIE STRAPPING METHOD AND APPARATUS

[75] Inventors: Paul W. Mercer, Redmond; Howard P. Stock, Bellevue, both of Wash.

[73] Assignee: The Boeing Company, Seattle, Wash.

[21] Appl. No.: 864,814

[22] Filed: Dec. 27, 1977

[51] Int. Cl.³ .................... B32B 31/16; B65B 13/32
[52] U.S. Cl. ................... 156/73.1; 53/589;
100/29; 100/33 PB; 100/33 R; 140/93.2;
140/123.6; 156/185; 156/187; 156/579;
156/580.1; 156/580.2
[58] Field of Search ............... 100/29, 33 PB, 33 R;
140/93.2, 123.6; 156/73.1, 73.4, 73.5, 185, 187,
195, 580.1, 579, 580.2; 53/589

[56] References Cited

U.S. PATENT DOCUMENTS

| | | | |
|---|---|---|---|
| 3,118,365 | 1/1964 | Rollo et al. | 100/33 R X |
| 3,250,209 | 5/1966 | Gage et al. | 100/33 R X |
| 3,442,203 | 5/1969 | Kobiella | 156/73.5 X |
| 3,442,735 | 5/1969 | Stensaker | 156/73.5 |
| 3,447,995 | 6/1969 | Dankert et al. | 100/33 PB X |
| 3,602,421 | 8/1971 | Spratt | 228/1 |
| 3,691,939 | 9/1972 | Goodley | 100/29 X |
| 3,946,769 | 3/1976 | Caveney et al. | 140/93.2 |
| 4,011,807 | 3/1977 | Kobiella | 100/29 X |

Primary Examiner—John T. Goolkasian
Assistant Examiner—Robert A. Dawson

Attorney, Agent, or Firm—Christensen, O'Connor, Johnson & Kindness

[57] ABSTRACT

A method and apparatus for wrapping a tape around an article, such as a bundle of elongate items (e.g., wires), tightening the tape, bonding layers of the tightened tape together and cutting the tape is disclosed. The apparatus or tool includes a clamshell assembly having a movable jaw that closes about the article to be strapped. Thereafter, tape, drawn from a reserve loop by a motor, is guided by a channel formed in the inner periphery of an aperture defined by the clamshell. The moving tape is spirally wrapped about the bundle of items and a latched backup foot located in the clamshell aperture. After the bundle and backup foot are encircled, by a suitable number of layers, a rack moves a plunger against the tape, causing the tape to tighten around the bundle and the backup foot. As the plunger tightens the tape, a new reserve loop is formed. Any additional tape needed to form a complete reserve loop is withdrawn from a tape supply spool. As the rack moves to tighten the tape, the backup foot is delatched and pulls the adjacent section of the tape against the tip of the horn of an ultrasonic transducer. After the tape is tightened, the ultrasonic transducer is actuated and the layers of tape pressed by the backup foot against the tip of the transducer are bonded (ultrasonically welded) together. Thereafter, the plunger is withdrawn, the tape adjacent to the bond is cut, the backup foot is latched and the movable clamshell jaw opened.

57 Claims, 9 Drawing Figures

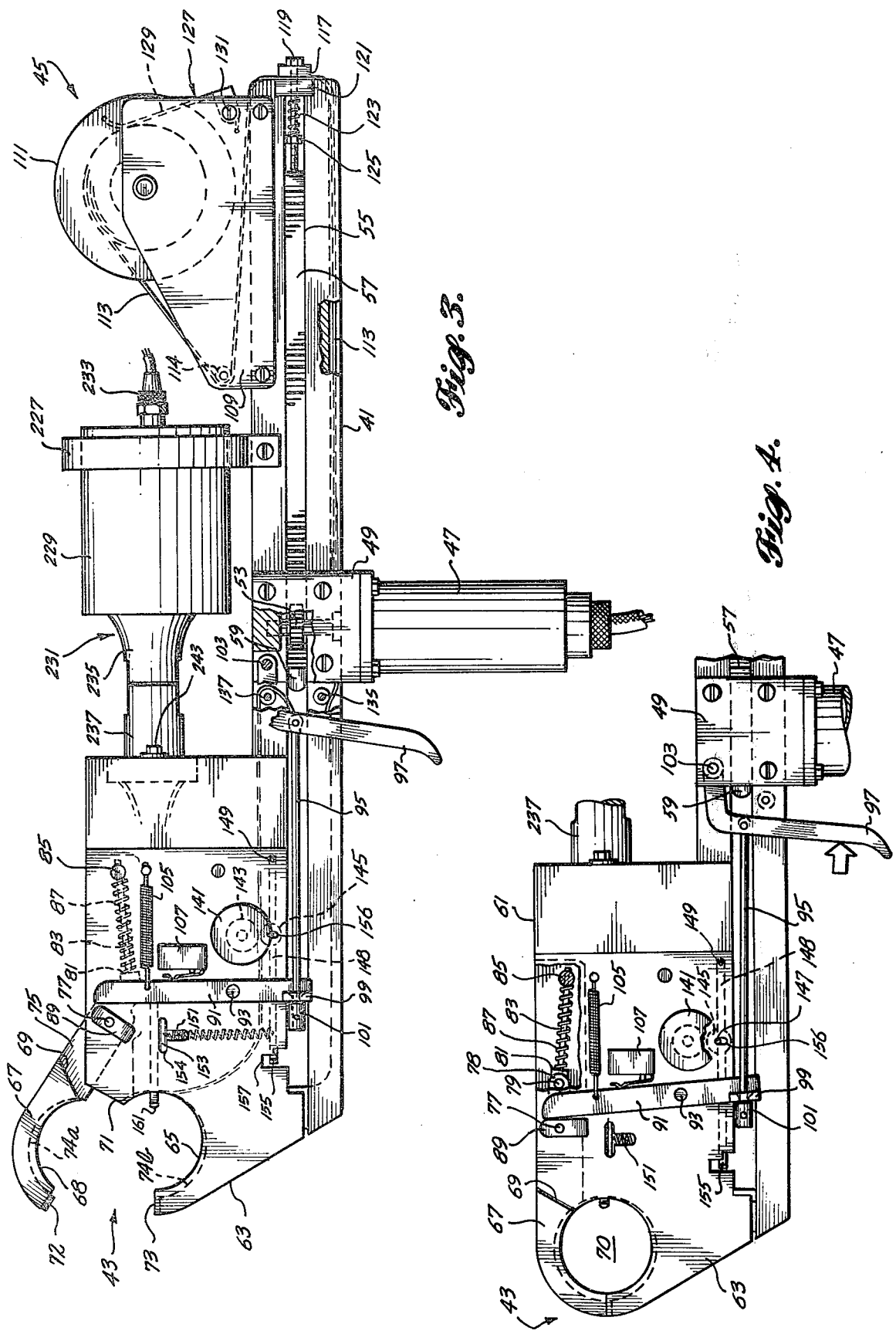

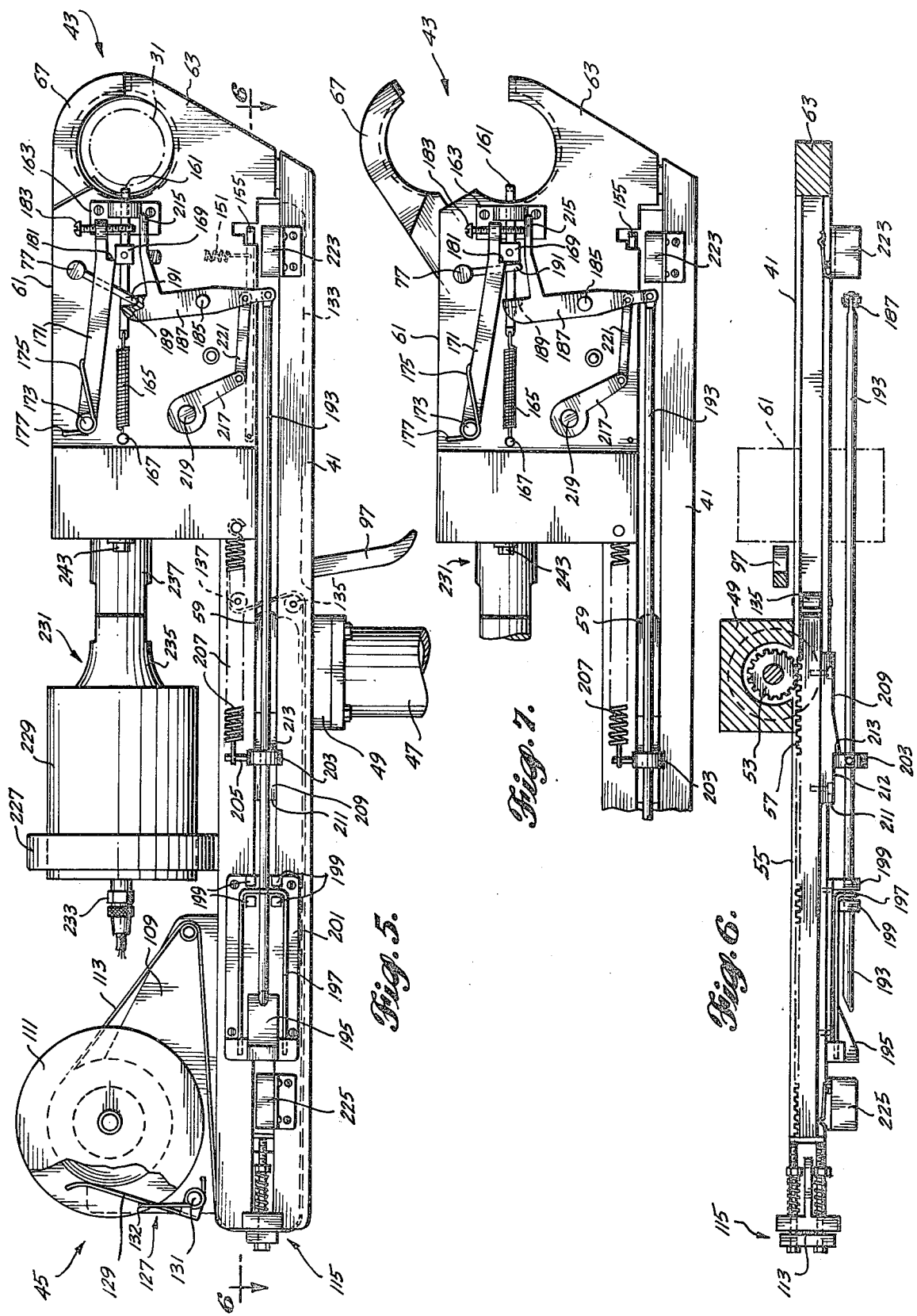

ULTRASONIC TAPE TIE STRAPPING METHOD AND APPARATUS

BACKGROUND OF THE INVENTION

This invention is directed to methods and apparatus for wrapping straps around articles.

The present invention was developed for use in strapping a bundle of elongate items, e.g., wires, together and is described with reference to such an environment. However, it will be appreciated that the invention can be utilized in other environments to strap other types of items together. In this regard, while wires, when strapped together, form a generally cylindrical bundle, noncylindrical bundles can be strapped using the invention. Moreover, the individual items can be noncircular or even dissimilar. Also, the invention can be used to wrap a strap around a single item, such as a box or a tube. In general any suitably sized article can be wrapped with a strap by the invention. Further, while, as will be better understood from the following description, the preferred strapping material is thermoplastic in nature, other materials that can be bonded using heat and pressure can be utilized. For example, rather than a thermoplastic material, which forms a bond under pressure and ultrasonic vibration as a result of the material softening and flowing together, the strapping material could be coated with an adhesive that is activated to form a bond when force and ultrasonic vibration is applied.

In the past, a wide variety of apparatus has been proposed for wrapping a strap around an article, such as a bundle of wires, together. In some apparatus, individual ties are delivered to a strapping mechanism that wraps the ties around the wires. One end of each tie may include a latch element and the other end a plurality of ratchet elements that coact with the latch element. Other ties use button like elements or rivets to affix the ends of the ties together. These systems have a number of disadvantages. First, individual ties are more expensive than desirable. Secondly, a bulge or protrusion is present in the region of the latch or button. The protrusion sometimes makes it difficult to pull a bundle of strapped wires through relatively small openings, because the protrusion gets caught on the edges of the openings. In addition, the protrusions have been found to abraid adjacent wire bundles when used in regions of high vibration. Also such ties are often formed of materials that deteriorate in high temperature environments.

Because of the disadvantages of latch type ties, many wire bundles are individually hand-tied. While hand-tying overcomes some of the foregoing disadvantages, it is time-consuming and, therefore, expensive. Moreover, hand-tying still results in a protrusion being formed, albeit a protrusion that is usually smaller than the protrusion that is formed by latch type ties.

Therefore, it is an object of this invention to provide a new and improved method and apparatus for strapping an article.

It is another object of this invention to provide a new and improved method and apparatus for forming a protrusionless strap around a bundle of elongate objects.

It is a further object of this invention to provide a new and improved tool for wrapping a strap around a bundle of wires that is, mechanically, relatively uncomplicated.

Another disadvantage of prior art mechanisms for automatically wrapping a strap around a bundle of elongate objects is their utilization of pneumatic and hydraulic power. While pneumatic and hydraulic systems are relatively reliable, they require a source of pneumatic or hydraulic power, which is not always readily available. Contrariwise, electrical power is more readily available in most environments.

Therefore, it is a subsidiary object of this invention to provide an electromechanical apparatus for wrapping a protrusionless strap around a bundle of objects.

SUMMARY OF THE INVENTION

In accordance with this invention, a method and apparatus for strapping tape, bondable together by heat and pressure when overlapped, around an article is disclosed. The method generally comprises the steps of: spirally wrapping at least one tape convolution around said article such that a region of tape overlap is formed; tightening said at least one tape convolution about said article; ultrasonically vibrating said tape overlap region so as to heat said tape overlap region; simultaneously applying pressure to said tape overlap region with said step of ultrasonically vibrating said tape so as to bond together the layers of tape in said tape overlap region; and, cutting the bonded tape convolution free. The apparatus of the invention generally comprises a back foot and a mechanism for spirally wrapping at least one tape convolution around the article and the backup foot such that a region of tape overlap is formed at the location of the backup foot. The apparatus of the invention also includes a mechanism for tightening the tape convolution about the article and the backup foot and a mechanism for bonding the overlapping layers of tape together in the region of the backup foot. The bonding mechanism comprises an ultrasonic transducer for vibrating the overlapping tape in the region of the backup foot and a backup foot control. The ultrasonic transducer includes a horn having a tip positioned so as to impinge on the tape in the region of the backup foot. The backup foot control causes the backup foot to press the tape layers against the tip of the horn of the ultrasonic transducer. The apparatus of the invention further includes a cutting mechanism for cutting the tape between the backup foot and the tightening mechanism.

A preferred embodiment of a tool formed in accordance with the invention for strapping a bundle of objects includes a clamshell assembly, having a movable jaw and a fixed jaw, adapted to close about the objects to be strapped. Tape, drawn from a reserve loop, is guided around the objects by a channel formed in the inner periphery of an aperture defined by the jaws of the clamshell assembly. In addition to being wrapped around the objects, the tape is also wrapped around a latched backup foot located in the aperture in the clamshell assembly. After being wrapped around the objects and the backup foot, the tape is tightened. Preferably, tightening is accomplished by a plunger that impinges on the tape. As the plunger moves, the tape is pulled back from the clamshell assembly, until the tape is tightened about the objects and the backup foot. This action causes a new reserve loop to be formed. Any additional tape necessary to form a complete reserve loop is pulled from a tape supply spool. In addition, as the tape is tightened, the latched backup foot is released and presses the adjacent region of the tape against the tip of the horn of an ultrasonic transducer. After the tape is tightened, the ultrasonic transducer is actuated and the regions of the tape lying between the backup foot and the end of the transducer are bonded (welded) together. After the tape is bonded, it is cut, the backup foot latched, and the clamshell assembly opened. Preferably, return movement of the plunger causes the tape cutting, relatching of the backup foot and opening of the clamshell actions to occur.

Preferably, the plunger is attached to, or formed by, one end of a rack that is moved by an electric motor. Further, preferably, the ultrasonic tape tie strapping tool is pistol shaped. The pistol shape includes a centrally located butt or grip in which a rack drive motor is mounted. The rack drive motor moves a rack having the plunger located on one end. Located on one side of the grip is a trigger. Actuation of the trigger automatically causes rack movement, which, in turn causes the tape wrapping, tightening, bonding and releasing actions to take place. In this regard, preferably, an electronic circuit including a pair of microswitches, located at either end of the path of travel of the rack, and a microswitch actuated when the clamshell assembly is closed, in conjunction with suitable timers, controls tape movement, movement of the rack and the actuation of the ultrasonic transducer. Also, preferably, brakes are provided along the path of travel of the tape to: prevent free wheeling of the tape supply spool; and, to control the power needed to withdraw additional tape from the spool. (The brake power must be such that the tape is adequately tightened by the plunger about the objects before additional tape is withdrawn from the spool.)

It will be appreciated from the foregoing description that the invention provides a method of, and apparatus for, wrapping a strap around an article. The article can be a single item or a plurality of items, such as a bundle of wires. Because the tape wraps are bonded together where they overlap (preferably, 2+ spiral tape wraps are formed) no protrusion is present in the resulting strap. Because no protrusion is present, a strapped wire bundle can easily be pulled through holes only slightly larger in diameter than the diameter of the bundle. Further, because no protrusion is formed, the protrusion cannot abraid the insulation on wires located in adjacent bundles. Moreover, the invention is mechanically uncomplicated. In the preferred form of the invention, the movement of a trigger causes a clamshell assembly to close and the actuation of a microswitch that automatically causes the other functions performed by the invention to take place. That is, actuation of the trigger microswitch causes tape first to be loosely wrapped around the bundle. After a suitable time period, a rack moves in one direction causing the tape to be tightened and bonded. After the tape is bonded, the rack moves in the reverse direction, causing the tape to be cut, a backup foot to be released, and the clamshell assembly to open. Because these actions require relatively uncomplicated rotary and linear motion, the mechanical mechanism for carrying them out is relatively uncomplicated.

It is pointed out here that, while the tool form of the present invention is entirely electromechanical because such a tool can be used in a greater number of environments, the tool can be formed so as to use hydraulic or pneumatic power, if desired.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 3 is an elevational view of one side (left) of a preferred embodiment of an ultrasonic tape tie strapping tool formed in accordance with the invention showing the clamshell assembly open;

FIG. 4 is a partial, elevational left-side view of the embodiment of the invention illustrated in FIG. 3 showing the clamshell assembly closed;

FIG. 5 is an elevational view of the other side (right) of the embodiment of the invention illustrated in FIG. 3 showing the clamshell assembly closed;

FIG. 6 is a cross-sectional view along line 6—6 of FIG. 5;

FIG. 7 is a partial, elevational right-side view of the embodiment of the invention illustrated in FIG. 3 with the clamshell assembly open;

DESCRIPTION OF THE PREFERRED EMBODIMENT

As will be better understood from the following description, the illustrated, preferred embodiment of the invention is a tool that has the general shape of a pistol. That is, the illustrated embodiment of the invention includes a pistol-like grip and a trigger located on one side of the grip. An elongate support structure or frame is located above and transverse to the longitudinal axis of the grip. One end of the frame supports a clamshell assembly that includes a jaw adapted to close about a bundle of elongate objects to be strapped. The other end of the frame supports a tape supply spool assembly, which supplies strapping tape. The tape runs from the supply spool assembly to the clamshell assembly along a path of travel hereinafter described. While the illustrated embodiment of the invention is in the form of a tool, it is to be understood that an apparatus formed in accordance with the invention could take on different forms.

Figure 1:
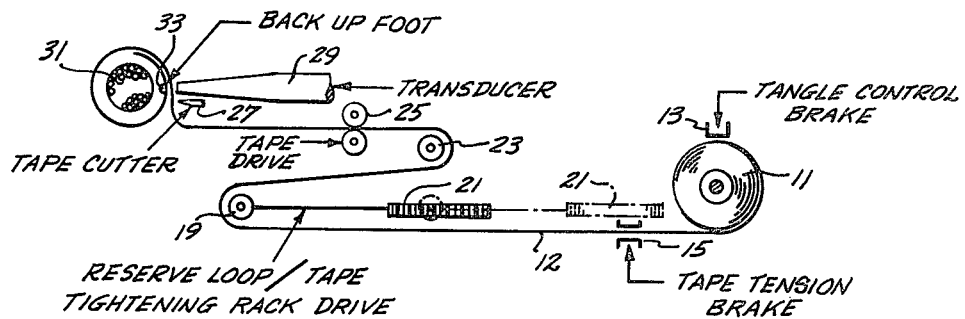
FIG. 1 is a schematic, line diagram of a preferred embodiment of an ultrasonic tape tie strapping apparatus formed in accordance with the invention and illustrates the major functional subsystems and their general location.

FIG. 1 is a schematic line diagram illustrating the method of the invention and, in general, the major subsystems of an apparatus for carrying out the method. More specifically, FIG. 1 illustrates a spool 11 of strapping tape 12. A tangle control brake 13 prevents the free wheeling of the spool 11. Tape 12 from the spool 11 passes through a tape tension brake 15. After passing through the tape tension brake 15, the tape travels along a relatively long linear path of travel. The tape then reverses direction, as it passes around a plunger 19 connected to one end of a rack 21. The rack 21 is adapted to move the plunger 19 back and forth along a path of travel running parallel to the relatively long linear path of travel of the tape. The rack and the plunger 19 form a reserve loop/tape tightening rack drive assembly. The portion of the tape lying between the extended and retracted positions of the plunger 19 is referred to as a reserve loop. After wrapping around the plunger 19, the tape runs parallel to a portion of the relatively long linear path of travel, until it reaches a roller 23 where the tape again reverses direction. The tape next passes through a tape drive 25. After the tape drive, the tape passes a cutter 27 and the tip of an ultrasonic transducer 29. After the transducer 29, the tape is spirally guided around the article to be strapped (which is illustrated as a bundle of wires 31); and, a backup foot 33 aligned with the tip of the ultrasonic transducer. Preferably the tape is spirally wrapped so as to form 2+ overlapping coils. Specifically, preferably, the tape is wrapped until three spiral layers of tape lie between the backup foot and the tip of the transducer.

In operation, at the time that strapping is to start, the plunger 19 is in a withdrawn or park position. This position is substantially to the right of the position shown in FIG. 1, as illustrated by the dashed lines. As a result, the reserve loop formed by the portion of the tape wrapped around the plunger 19, when the plunger was moved to the position illustrated by the solid lines in FIG. 1 during the previous cycle of operation, is free. The first step is to wrap the tape around the article. In this regard, when a trigger (not shown) is actuated, the tape drive 25 is energized. The tape drive draws tape from the reserve loop and loosely wraps it around the objects 31 and the backup foot 33. This loose spiral wrapping step uses a substantial portion, if not all, of the tape forming the reserve loop. If additional tape should be needed, it is withdrawn from the spool 11.

After the tape is loosely wrapped around the bundle 31, the rack 21 moves the plunger 19 from right to left (as viewed in FIG. 1). At the start of movement of the rack 21, the backup foot is released and pulls the tape layers located between the backup foot and the tip of the transducer against the transducer tip. The force between the backup foot and the transducer 29 is such that the tape remains free enough to be pulled back as the plunger 19 moves from right to left. That is, the force needed to pull back the tape is less than the force applied by the tape tension brake 15. As a result, the tape spirals are tightened about the article. At some point the tightened tape pressure becomes greater than the tape tension brake pressure, whereby further plunger movement causes tape to be withdrawn from the spool 11. When the rack 21 reaches the end of its "forward" path of travel, the ultrasonic transducer 29 is energized. The tip of the ultrasonic transducer 29 vibrates transversely with respect to the tape (i.e., toward and away from) over a limited distance (1–1½ mils). The vibration of the tip of the ultrasonic transducer 29 causes the tape to be softened. The tape is softened to the point that the force created by the backup foot pressing the tape against the transducer tip is adequate to cause the layers of tape located between the transducer tip and the backup foot to flow together. As a result a bond or weld is formed.

After the tape is bonded, the rack 21 returns to its park position and withdraws the plunger 19. This action causes: the tape cutter 27 to cut the tape; and, the backup foot to be moved away from the transducer 29 and latched. When the rack reaches the end of its park position, a cycle of operation is complete. At this point, a new reserve loop is available to form the next strap.

Figure 2:
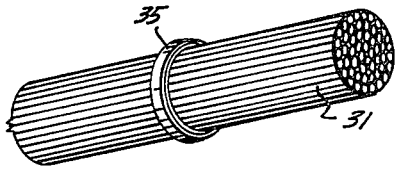
FIG. 2 is a isometric view of a bundle of wires strapped by a tape tie applied by an ultrasonic tape tie strapping tool formed in accordance with the invention.

FIG. 2 illustrates the end result of the just described sequence of steps. That is, FIG. 2 illustrates the wire bundle 31 surrounded by a tape strap 35. (While a multitude of wires are illustrated, the bundle could include only two wires.) Preferably, the tape 12 is formed of a thermoplastic material, such as a polyester (coated with a polyamide). A specific example of a tape is Dacron coated with nylon. However, any tape that is bondable together under heat and pressure can be used, including tapes that are coated with a material that bonds under heat and pressure of the nature created by ultrasonic vibration and backup foot pressure.

FIGS. 3-8 illustrate a preferred embodiment of an ultrasonic tape tie strapping tool formed in accordance with the invention. As will be readily appreciated by those skilled in the art and others, while a housing is not shown in FIGS. 3-8, the pistol like strapping tool illustrated would normally have its mechanical components enclosed by a housing. A suitable housing could be formed of high impact plastic, for example.

The ultrasonic tape die strapping tool illustrated in FIGS. 3-8 includes an elongate main frame 41. Mounted atop the main frame 41, on one end thereof, is a clamshell assembly 43. (Since the tool can be used in various positions the words used herein denoting position, e.g., atop, beneath, in front of, behind, etc. are used for ease of description only and should not be construed as limiting). Mounted atop the frame 41 on the other end thereof is a spool assembly 45. Mounted beneath the frame 41, generally in the center thereof, is a rack drive motor 47. More specifically, a bracket 49 is attached to the frame 41. Affixed to the lower face of the bracket 49 is the rack drive motor 47.

The rack drive motor 47 is bidirectional and includes a vertically oriented shaft 51 having a spur gear 53 mounted near its upper end. Mounted in an elongated slot 55 in the main frame 41 is a rack 57. The elongate slot lies parallel to the longitudinal axis of the main frame and the rack is adapted to move back and forth, as hereinafter described, when the rack drive motor 47 is energized. That is, the rack 57 is positioned such that the teeth of the rack interact with the teeth of the spur gear 53 driven by the rack drive motor 47. Thus, as the rack drive motor is energized such that its shaft 51 revolves in one direction or the other, the rack 57 is moved in one direction or the other. The rack is held in place in the frame 41 by channels or other suitably shaped guides. Located on the end of the rack 57 nearest to the clamshell assembly 43 is a semicircular plunger 59.

Affixed to (or formed unitarily with) the top of the main frame 41 on the clamshell assembly end of the tool is a subframe 61. The subframe 61 is generally flat (except for an enlarged rear end) and lies in the plane of the main frame 41. The subframe 61 supports, on either side and internally, a plurality of mechanical mechanisms hereinafter described. In addition, the upper, outer corner of the subframe 61 forms a part of the clamshell assembly 43. More specifically, the clamshell assembly 43 comprises two jaws, a fixed jaw 63 and a movable jaw 67. The fixed jaw 63 is formed in the upper, outer corner of the subframe 61 and includes a circular opening 65 that covers approximately ⅝ of a circle. The movable jaw 67 of the clamshell assembly 43 is generally hook-shaped and defines a circular opening 68 that covers approximately ⅜ of a circle. When the jaws are appropriately positioned (i.e., the movable jaw is closed), as hereinafter described, the jaw openings 65 and 68 define a circular aperture 70 (FIG. 4).

The end of the movable jaw 67 that defines the circular opening 68 is thicker than the other end 75. Specifically, the movable jaw includes shoulders 69, one located on either side, between its thick and thin ends. The jaw shoulders 69 impinge on the tips 71 of the outer upper corner of the subframe 61 when the clamshell assembly is closed. More specifically, the outer upper corner of the subframe 61 is split into two spaced pieces. Lying between the two pieces is the thin end 75 of the movable jaw. A hinge pin 77 affixed to the movable jaw and rotatably mounted in the subframe allows the jaw to rotate open and closed. When the jaw is closed, the jaw shoulders 69 rest on the tips 71 of the upper outer corner of the subframe.

The outer tip of the thick end of the movable jaw 67 includes a protrusion 72 adapted to fit into an aperture 73 formed in the outer tip of the fixed jaw 63, when the clamshell assembly 43 is closed. Finally, a tape guide channel 74 is formed in the inner periphery of the circular openings 65 and 68 of the fixed and movable jaws 63 and 67. Thus, the tape guide channel circumscribes the circular aperture 70. The channel is deepest where the movable jaw protrusion 72 meets the fixed jaw aperture 73 and narrowest at the diametrically opposed area of the circular aperture 70. In between, the channel tapers in a uniform manner.

The thin end 75 of the movable jaw is elongate and extends outwardly from the thick or hook shaped end, as previously described. Projecting outwardly from the tip of the thin end 75 is a teat 78. The teat lies in the slot between the two spaced pieces forming the outer upper corner of the subframe 61. The teat includes an aperture lying orthogonal to the plane of the thin end 75. A pin 79 rotatably affixes the aperture in the teat to the apertures in a yoke 81. The yoke is mounted on one end of a rod 83. The other end of the rod 83 passes through a shaft 85 located near the other end of the slot in the subframe 61 within which the thin end 75 of the movable jaw 67 lies. The shaft 85 is rotatably mounted in the walls defining the slot. Mounted on the rod 83, between the yoke 81 and the shaft 85 is a coil spring 87. The yoke 81, rod 83, coil spring 87 and shaft 85 form an overcenter latch mechanism. When the movable jaw 67 is rotated, as a result of the rotation of the hinge pin 77 in the manner hereinafter described, the overcenter latch mechanism latches the jaw either open or closed. More specifically, the elements forming the overcenter latch mechanism are formed such that a line passing through the hinge pin 77 and the pin 79 forms an obtuse angle with the longitudinal axis of the rod 83 that points upward, when the movable jaw 67 is closed. The same line and axis form an obtuse angle that points downwardly when the movable jaw 67 is open. The line and the rod axis coincide at some point when the jaw 67 is moved between its open and closed positions.

Mounted on the left side of the subframe 61 and affixed to the hinge pin 77 is a rocker block 89. The rocker block 89 is rectangular and had a longitudinal axis that lies orthogonal to the line passing through the hinge pin 77 and the pin 79. Since the rocker block 89 is affixed to the hinge pin 77, the rocker block rotates with the movable jaw 67 of the clamshell assembly 43.

Also mounted on the left side of the subframe 61 is a jaw closure lever arm 91. The jaw closure lever arm 91 lies generally orthogonal to the longitudinal axis of the main frame 41. The upper end of the jaw closure lever arm 91 lies immediately behind (with respect to the clamshell assembly 43) the rocker block 89 such that the upper tip of the jaw closure lever can impinge on the rocker block 89. The bottom end of the jaw closure lever arm 91 is located adjacent to the slot 55 within which the rack 57 slides. Located intermediate the ends of the jaw closure lever arm 91, slightly nearer to the lower end, is a pin 93. The pin 93 is affixed to the subframe 61 and the jaw closure lever arm 91 is rotatably mounted on the pin. A connecting rod 95 connects the lower end of the jaw closure lever arm 91 to a trigger 97. The connecting rod 95 is located on the left side of the tool, and lies along an axis lying generally parallel to the slot 55 within which the rack 57 slides. One end of the connecting rod 95 passes through an aperture in a flange 99 extending outwardly from the lower end of the closure lever arm clamshell assembly side of the flange 99 is a collar 101. The collar is affixed to the connecting rod 95.

The trigger 97 is rotatably attached to the main frame 41 by a pivot pin 103 located in the region where the bracket 49 that supports the rack drive motor 47 is attached to the main frame 41. The pivot pin is also located above the slot 55 in which the rack 57 slides. The trigger projects downwardly so as to lie in front of the rack drive motor 47. The other end of the connecting rod 95 is connected to the trigger 97. Hence, when the trigger is pulled toward the rack drive motor, the jaw closure lever arm 91 is rotated about the axis of the pin 93. Rotation is counterclockwise when viewed from the left side of the tool. As a result, the upper end of the jaw closure lever arm applies a force to the upper tip of the rocker block 89. This force is adequate to rotate the movable jaw closed, as hereinafter described.

A trigger return coil spring 105 has one end connected to the jaw closure lever arm 91, between the pin 93 and the upper end of the jaw closure lever arm. The other end of the trigger return coil spring 105 is connected to the subframe 61 behind the jaw closure lever arm 91, i.e., on the side of the jaw closure lever arm 91 remote from the clamshell assembly 43. The longitudinal axis of the coil spring lies generally orthogonal to the longitudinal axis of the jaw closure lever arm.

In operation, when the trigger 97 is pulled toward the rack drive motor 47, the connecting rod 95 rotates the jaw closure lever arm 91 about the pin 93. If the movable jaw 67 is positioned such that the clamshell is open when the trigger is pulled, the upper end of the jaw closure lever arm 91 impinges on the upper rear corner of the rocker block 89. This impingement causes the movable jaw 67 to rotate about the axis of the hinge pin 77. When the overcenter latch mechanism passes through its center position, the movable jaw 67 latches closed. When released, the trigger 97 returns to its normal position, due to the force created by the trigger return coil spring 105. Release of the trigger, of course, does not cause the movable jaw to reopen.

Also mounted on the left side of the subframe 61 beneath the return coil spring 105 is a trigger switch 107. The trigger switch 105 includes an actuating element that impinges on the adjacent side of the jaw closure lever arm such that the trigger switch is actuated when the trigger 97 moves the jaw closure lever arm to close the movable jaw 67 in the manner previously described. More specifically, when the lever arm 91 is moved so as to close the movable jaw 67 of the clamshell assembly, the trigger switch 107 is actuated. Actuation of the trigger switch starts the sequence of operation of the control circuit illustrated in FIG. 9 and hereinafter described.

The spool assembly 45 includes a pair of plates 109, one mounted on either side of the main frame 41. The plates project above the main frame 41. Mounted between the plates 107 above the frame 41 is a tape supply spool 111. Strapping tape 113 exits from atop the tape supply spool 111 and angles downwardly toward the main frame 41, in the general direction of the rack drive motor. The tape passes over a roller or pin 114 extending between the brackets 109. After the running around the roller or pin 114, the tape 113 heads toward the rear of the main frame 41, passing beneath the spool 111. At the rear of the main frame 41, the tape passes through a tape tension brake 115. The tension brake 115 is formed by a plate 117 overlying the rear end of the main frame 41. A bolt 119 passes through a flange 121 projecting outwardly from each side of the main frame 41; and, through the adjacent regions of the plate 117. Mounted on the bolts on the side of the flanges 121 remote from the plate 117 are coil springs 123. Coil spring tension is controlled by nuts 125 mounted on the bolts 119. The nuts press the springs against the flanges 117 and, thus, control the pressure applied by the plate against the tape 113.

A tangle brake 127 is formed by a plate 129 that is pressed against the outer periphery of the tape on the spool 111 by a torsion spring 132 (FIG. 5). The tangle brake 127 is located toward the rear of the spool 111 and is mounted on the pin 131 that extends between the plates 109. The tangle brake prevents free wheeling of the spool.

After passing through the tape tension brake 115, the tape 113 enters a longitudinal channel formed in the lower edge of the main frame 41. The channel passes through the bracket 49 that supports the rack drive motor 47. After passing through the bracket 49, the tape enters an elongate cavity 133. The cavity is formed in the main frame 41 and extends from the bracket 49 to the clamshell or front end of the frame 41. It is in the cavity 133 that the reserve loop is formed.

As the tape enters the cavity, it passes around the upper periphery of a lower roller 135, located at the cavity entrance. The tape forms an elongate loop in the cavity along the longitudinal length of the cavity 133; and, exits about an upper roller 137 located immediately above the entrance roller 135. After leaving the upper roller 137, the tape enters a channel 138 (FIG. 8) that extends through the subframe 61. The path of the channel 138 in the subframe 61 first extends toward the clamshell end of the tool, generally parallel to the slot 55 in which the rack 57 moves. The channel 138 then curves upwardly, through a cutter block 140, and exits at a point generally diametrically opposite to the point where the outer tips of the fixed and movable jaws of the clamshell assembly meet. The tape exits along a line that lies generally tangent to the channel in the circular aperture in the clamshell assembly formed when the movable jaw is closed. Thus, when the tape is moved in the manner, hereinafter described, it follows the pathway defined by the circular aperture channel and forms a spiral.

Also affixed to the subframe 61 on the left side of the tool is a tape drive motor 41. The tape drive motor includes a shaft that projects orthogonally into the subframe 61, above the channel 138 through which the tape moves. Mounted inside of the subframe, on the shaft of the tape drive motor 141, is a tape drive roller 143. The drive roller is aligned with the channel 138 through which the tape moves. Located beneath the drive roller 143, on the opposite side of the tape channel 138, is an idler roller 145.

The idler roller 145 is spring biased against the drive roller 143. More specifically, the idler roller 145 is mounted on a shaft 147. Located on either side of the idler roller 145, inside of the subframe 61 are a pair of elongate bars 148. The bars lie beneath the shaft 147 on which the idler roller is mounted, along an axis that lies generally parallel to the path of travel of the rack 57. The ends of the bars remote from the clamshell assembly end of the rool are pinned by pins 149 to the subframe 61. Affixed to the bars, near their other ends, are one end of coil springs 151. The other ends of the coil springs, which project orthogonally upwardly from the bars 149, are attached to pins 153. The coil springs are housed inside of the subframe 61 and the pins 153 lie in slots 154 in the subframe. The slots 154 have a longitudinal axis lying orthogonal to the longitudinal axis of the coil springs 151. The coil springs 151 create an upward force on the bars 148. As a result, the bars, via the shaft 147 of the idler roller 145, press the idler roller against the drive roller 143. Vertical shaft 147 movement is allowed because the ends of the shaft are mounted in vertical slots 156 formed in the subframe 61.

Located on the ends of the bars 148 remote from the pivot ends are protrusions 155. The protrusions project outwardly, through apertures 157 formed in the sidewalls of the subframe 61. Manual movement of protrusions downwardly, against the action of the coil springs 151, allows the idler roller 145 to move away from the drive roller 143 under the force of gravity. This action occurs during loading, when the tape is fed into the channel 138. As a result, tape can be fed between the idler roller 145 and the drive roller 143.

The mechanical mechanism mounted on the right side of the tool is best illustrated in FIGS. 5–7. In general, this mechanism controls: the position of a backup foot 161 located in the circular aperture defined by the clamshell assembly 43; the cutting of the tape; and, the opening of the movable jaw 67 of the clamshell assembly 43.

The backup foot 161 is an L-shaped element having short and long legs. The short leg lies in the circular aperture and the clamshell assembly, along an axis orthogonal to the plane of the circular aperture. The long leg of the backup foot 161 slides in a channel formed in a bracket 163 attached to the right side of the subframe 61. The channel in the bracket lies generally parallel to the slot 55 in which the rack 57 slides. Attached to the end of the long leg of the backup foot is one end of a coil spring 165. The other end of the coil spring 165 is attached to a pin 167, affixed to the subframe, that lies along the extended axis of the long leg of the backup foot 161. The coil spring 165 creates a force that pulls the short leg of the backup foot 161 toward the adjacent edge of the circular aperture 70 defined by the clamshell assembly. As will be better understood from the following discussion, located in the wall of the circular aperture, adjacent the short leg of the backup foot 161, is the tip of an ultrasonic transducer.

Affixed to the long leg of the backup foot 161, intermediate the ends thereof, is a square protrusion 169. Mounted above the long leg of the backup foot 161, and its associated coil spring 165, is a backup foot lever arm 171. The backup foot lever arm 171 is rotatably mounted on a shaft 173 located above the pin 167 to which the backup foot coil spring 165 is connected. Mounted on the shaft 173 is a torsion spring 175. One leg of the torsion spring 175 is bent toward the adjacent wall of the subframe and extends into an aperture 177 formed therein. The other leg of the torsion spring 175 is formed so as to impinge on the upper surface of the backup foot lever arm 171. The torsion spring 175 rotates the backup foot lever arm 171 toward the backup foot 161. The underside of the movable end of the backup foot lever arm 171 includes an undercut area that defines a shoulder 181. The shoulder is adapted to drop down and impinge on the backside of the square protrusion 169 (i.e., the side nearest the backup foot coil spring 165), when the protrusion 169 is moved toward the circular aperture 70 in the manner hereinafter described. Formed in the outer tip of the backup foot lever arm 171 is a threaded aperture within which an adjustment screw 183 is mounted. The adjustment screw 183 passes through the backup foot lever arm 171 along an axis lying transverse to the longitudinal axis of the backup foot lever arm 171; and, parallel to adjacent wall of the subframe 61.

Projecting outwardly from the right side of the subframe 61, below the backup foot 161 is a shaft 185. A jaw open lever arm 187 is rotatably mounted on the shaft 185 at a point intermediate the ends of the lever arm. The upper end of the jaw open lever arm 187 includes a cavity 189 adapted to impinge on the lower end of a pin 191. The pin 191 passes orthogonally through the shaft 77 to which the movable jaw 67 of the clamshell assembly is affixed. The pin 191 and the jaw open lever arm 187 are positioned such that when the movable jaw 67 is closed, the pin and the lever arm define an obtuse angle that points toward the spool assembly 45.

The lower end of the jaw open lever arm 187 is connected to one end of a rod 193. The rod lies on the right side of the tool, parallel to the slot 55 within which the rack 57 slides. The other end of the rod 193 is bevelled, as best illustrated in FIG. 5. The bevelled end of the rod coacts with a ramp cam 195 mounted on a bracket 201 attached to the main frame 41. The bevelled end of the rod 193 is pulled toward the frame 41 by a spring 197. More specifically, the spring 197 has a semicircular center region that lies between a pair of slotted flanges 199 projecting outwardly from the bracket 201, in front of the ramp cam 195. The semicircular portion of the spring 197 terminates at a pair of unitary arms that project orthogonally outwardly from the plane defined by the semicircular portion of the spring 197. The arms project rearwardly and are restrained on either side of the ramp 195. The rod 193 passes through the slots in the flanges 199, under the semicircular portion of the spring 197. Because the ends of the arms of the spring 197 are restrained, the spring tends to press the rod toward the main frame. The arms, however, are long enough to allow the rod to move outwardly when the rod is moved longitudinally, in the manner hereinafter described, so as to cause the bevelled end of the rod to ride up on the ramp cam 195.

Mounted on the rod 193 between the bracket 201 and the subframe 61 is a collar 203. The collar includes a vertical protrusion 205 connected to one end of a coil spring 207. The other end of the coil spring 207 is attached to the subframe 61. The longitudinal axis of the coil spring 207 lies generally parallel to the rod 193 and the force produced by the coil spring 207 pulls the rod away from the ramp cam 195.

Affixed to the rack 57 is an actuating block 209. The actuating block 209 projects through the slot 55 in the main frame 41 and coacts with the collar 203. More specifically, the end 211 of the actuating block 209 nearest the ramp cam protrudes outwardly from the main frame 41 such that this end of the block is able to impinge on the collar 203 when the rod 193 is pulled near to the main frame by the spring 197. Located intermediate the ends of the actuating block 209 is a shoulder 213. The shoulder 213 protrudes outwardly beyond the surface 212 of the actuating block lying between the shoulder and the end 211 of the block that impinges on the collar 203.

In operation, when the rack is moved toward the spool end of the frame 41 by the rack motor in the manner herein described, the rear end 211 of the block 209 impinges on the collar 203. As a result, the collar 203 and the rod 193 are moved toward the spool assembly end of the tool. This action rotates the jaw opening lever arm 187, causing the movable jaw to open. More specifically, as the jaw opening lever 187 rotates in a clockwise direction (as viewed in FIG. 5) the upper or cavity 189 end thereof pushes the lower end of the pin 191 toward the clamshell assembly. Since the pin 191 passes through the shaft to which the movable jaw 67 of the clamshell assembly is affixed, the movable jaw is rotated to an open position. Since the pin 191 impinges on the rectangular protrusion 169 of the backup foot 161, the backup foot is moved in the direction of the clamshell assembly, when the movable jaw is rotated open. When the jaw reaches its open position, the protrusion 167 is moved to a point in front of the shoulder 181 formed in the backup foot lever arm 171. When this protrusion position is reached, the torsion spring 173 rotates the lever arm 171 downwardly and the backup foot is latched.

As movement of the rack continues toward the spool assembly end of the tool, the rear end of the rod 193 is pushed outwardly by the ramp cam, against the force created by the spring 197. At some point the ramp cam raises the collar beyond the rear edge 211 of the actuating block 209. When this position is reached, the coil spring 207 pulls the actuating rod, in a snap action, toward the clamshell assembly end of the main frame 41. Actuating rod movement in this direction ends when the collar 203 impinges on the should 213.

Extending transversely outwardly from the clamshell assembly side of the jaw opening lever arm 187 is a backup foot latch release arm 215. The backup foot release arm extends to a point below the adjusting screw 183 mounted in the outer end of the backup foot lever arm 171. The backup foot release lever arm 215 releases the backup foot, i.e., allows the backup foot coil spring 165 to pull the backup foot toward the transducer tip. Specifically, prior to the rack moving toward the clamshell assembly end of the frame 41 (after the jaw is closed), the coil spring 207 is slightly tensed. That is, the coil spring 207 is slightly tensed when the collar 203 is impinging on the shoulder 213 of the actuating block 209. When the rack starts to move toward the clamshell assembly end of the frame 41, this spring force moves the rod 193 in the same direction, causing the jaw opening lever arm 187 to rotate in a counterclockwise direction. As a result, the outer end of the backup foot release arm 215 raises the backup foot lever arm. The outer end of the backup foot lever arm is raised by an amount adequate to lift the shoulder 181 of the backup foot lever arm 171 above the square protrusion 169. As a result, the backup foot 161 is released and pulled, by the backup foot spring 165, toward the tip of the ultrasonic transducer hereinafter described.

Figure 8:
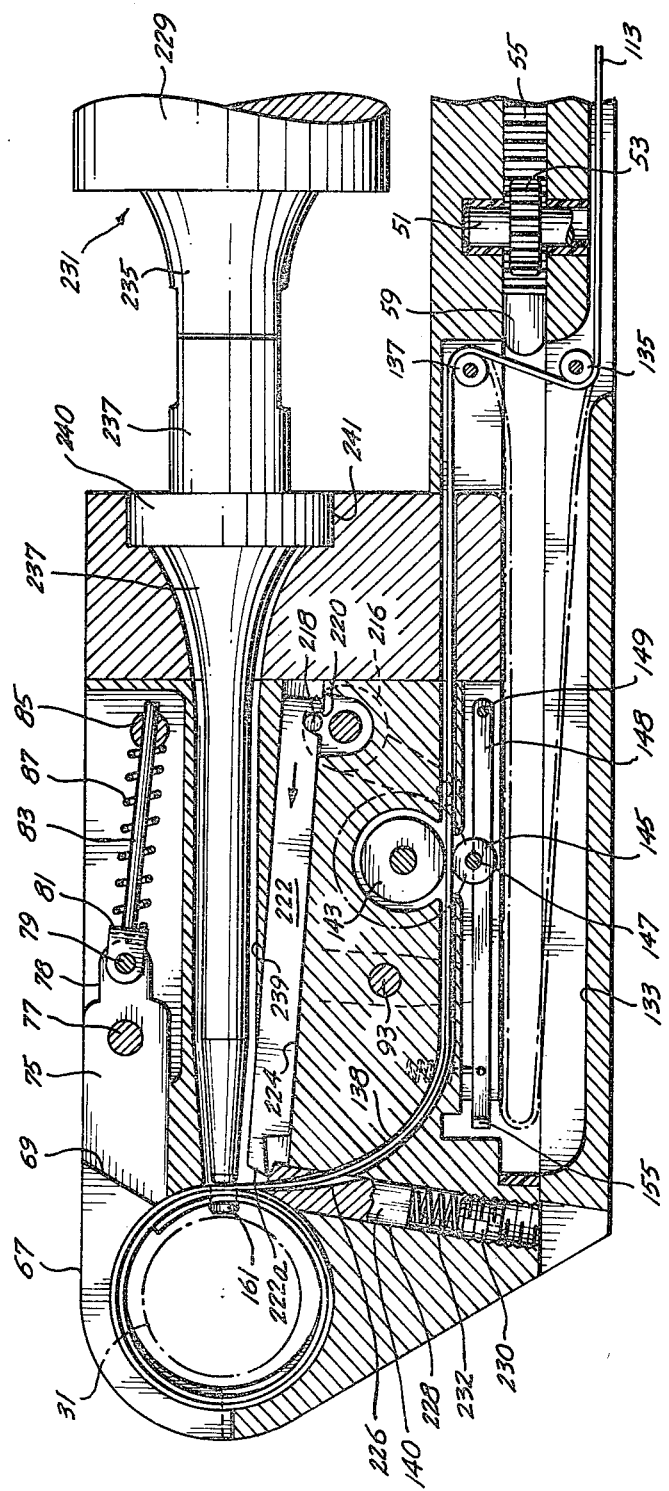
FIG. 8 is a cross-sectional view of the clamshell assembly end of the embodiment of the invention illustrated in FIG. 3.

In addition to controlling the opening of the movable jaw 67 and the latching and delatching of the backup foot lever arm, movement of the jaw open lever arm 187 by the rod 193 also controls cutting of the tape 113. Specifically, one end of a link 221 is rotatably connected to the jaw open lever arm between the shaft 185 and the lower end of the lever arm. The other end of the link 221 is rotatably connected to a cutter lever arm 217. The cutter lever arm is affixed to a shaft 219. Mounted on the shaft 219, inside of the subframe 61, as shown in FIG. 8, is a crank disc 216. Projecting outwardly from one surface of the crank disc, near the outer periphery thereof is a crank pin 218. The crank pin lies in a slot 220 formed in one end of a cutter blade 222. The cutter blade is adapted to reciprocate in a slot 224 formed in the subframe 61, when the crank disc 216 rotates and moves the crank pin 218 back and forth, in the manner herein described. The other end 222a of the cutter blade is adapted to slide over the cutter block 140 through which the tape moves. More specifically, as previously described, the tape travels through the cutter block. The path of travel is defined by a channel 226. The channel is larger in cross-sectional size than the channel 138 in the subframe 61 through which the tape travels in the region where the two channels meet. The larger cross-sectional portion of the cutter block channel tapers down to a size slightly larger than the size of the tape, as it curves upwardly. This taper arrangement allows the vertical position of the cutter block to be adjusted without creating a shoulder that makes tape threading difficult. More specifically, the cutter block 140 is elongate and mounted in an elongate hole 228 of similar cross-sectional size and shape. The elongate hole projects upwardly from the bottom of the subframe 61 and terminates just below the location of the backup foot 161 and the tip of the horn of the ultrasonic transducer. The cutter block is held in the elongate hole 228 by a set screw 230 that presses a coil spring 232 against the lower end of the cutter block. The upper end of the side of the cutter block facing the circular aperture 70 defined by the clamshell assembly tapers inwardly and forms a cam surface. The adjacent region of the subframe 61 tapers in the same direction. The set screw, by controlling the pressure applied to the cutter block 140, controls the pressure applied to the tapered surfaces and, thus, the vertical position of the upper end of the cutter block. The portion of the upper end of the cutter block, behind the opening formed by the end of the cutter block tape channel 226 is relieved, i.e., tapers downwardly, away from the plane defined by the remainder of the upper end of the cutter block.

The cutting end 222a of the cutter blade 222 is undercut in its lower corner so that the upper corner can ride over the upper end of the cutter block. Further, the upper corner is chisel shaped, i.e., it tapers rearwardly.

In operation, when the rod 193 is moved toward the spool assembly end of the tool in the manner previously described, the jaw open lever arm 187 moves the link 221, causing the cutter lever arm 217 to rotate the shaft 219. This rotation, via the disc crank 216 and crank pin 218 moves the cutter blade toward the circular aperture 70. As a result, the chisel end of the cutter blade passes over the upper end of the cutter block, cutting the tape beneath the backup foot 161. The tapered or relieved rear portion of the upper end of the cutter block prevents tape from "following" the cutter blade when it returns to its back or park position.

Located on the right side of the tool near the end of the slot 55 in which the rack moves, nearest the clamshell assembly end of the frame 41, is a rack forward microswitch 223. Located between the ramp 195 and the brake 115 is a rack park microswitch 225. The rack forward microswitch is actuated by the rack when the rack is in its most forward position, i.e., is nearest the clamshell assembly end of the frame 41. The rack park microswitch 225 is actuated by the rack when the rack reaches its park position, i.e., is nearest the spool 111. In other words, the microswitches are located, and actuated, at the extreme ends of the path of travel of the rack 57.

Affixed to the frame 41, between the spool assembly 45 and the subframe 61 is a collar 227. The collar supports a cylinder 229 whose extended longitudinal axis passes through the short leg of the backup foot 161. Mounted in the cylinder 229 is the converter end of an ultrasonic transducer 231. The cylinder 229 supports the ultrasonic transducer 231 such that it is free to vibrate along its longitudinal axis, but prevented from moving laterally. A shielded cable connector 233 is located on the end of the cylinder 229 nearest the spool assembly. The connector connects a shielded cable carrying high frequency electrical energy to the converter of the ultrasonic transducer. A slug or ultrasonic coupler 235 projects outwardly from the cylinder 229 toward the subframe. The coupler 235 has a horn 237 affixed to its outer end. The horn projects into a suitable cavity 239 formed in the subframe 61. The transducer horn converges downwardly into a tip substantially equal in cross-sectional size to the size to the short leg of the backup foot 161. The tip is located, as previously noted, immediately behind the short leg of the backup foot 161 such that when the backup foot becomes delatched, it presses tape layers located between the backup foot and the transducer tip against the transducer tip. The horn 237 includes an outer ring 240 located at a nodal plane. The ring is mounted in a cylindrical cavity 241 formed in the rear wall of the subframe 61. Preferably an O-ring (not shown) or other suitable ultrasonic vibration insulator is located between the ring and the forward wall of the cylindrical cavity so that longitudinal vibration is not inhibited. Bolts 243 are located about the periphery of the cavity. The bolts 243 press the surfaces of washers against the adjacent peripheral surface of the ring 239 of the horn 237, whereby the horn is held in the subframe. The forward portion of the horn 237 lies in the cavity 239 so as to be spaced from the walls thereof.

The preferred frequency of operation of the ultrasonic transducer is seventeen (17) KHz. The transducer is formed in accordance with well-known ultrasonic transducer principles such that its tip vibrates at this frequency through a distance of approximately $1\frac{1}{2}$ mils.

Figure 9:
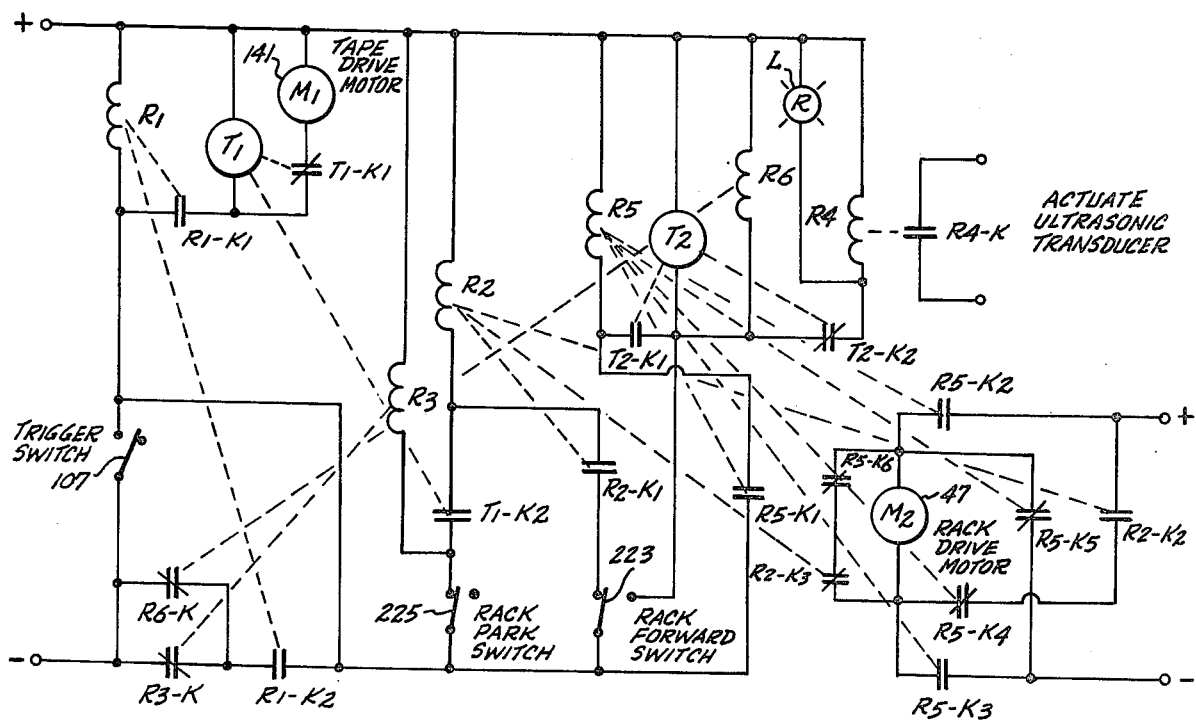
FIG. 9 is an electronic schematic diagram of a control system for controlling the operation of the ultrasonic tape tie strapping tool illustrated in FIGS. 3-8.

Prior to describing the electronic system illustrated in FIG. 9, a summary discussion of the operation of the mechanical mechanism of the tool illustrated in FIGS. 3-7 is presented. As previously noted, the sequence of operation of the tool starts when the trigger 97 is moved toward the rack drive motor 47. This action causes the jaw closure lever arm 91 to close the jaw 67 of the clamshell assembly 43. At the same time, the trigger switch 107 is actuated. When the trigger switch is actuated, the tape drive motor is started. The tape drive motor draws tape from the reserve loop and delivers it to the circular aperture 70. The channel in the circular aperture spirally wraps the tape around a wire bundle, or other article to be strapped, located in the circular aperture. Preferably 2+ wraps are formed, whereby three layers of tape are formed in the region of the backup foot. In most other areas, two layers of tape are formed. After a predetermined period of time, sufficient to allow the tape drive motor to move an adequate amount of tape through the channel in the circular aperture to form the required number of wraps, the tape drive motor is stopped. Next, the rack drive motor 47 is started. As the rack drive motor moves the rack toward the clamshell assembly end of the frame 41, excess tape is pulled back from the circular aperture, as previously described, and the wraps are tightened. After the wraps are tightened, continued movement of the rack pulls excess tape from the spool 11. As previously noted, when the rack started to move, the coil spring 207 attached to the rod 193 caused the backup foot lever arm 215 to raise upwardly and release the backup foot 161.

When the rack reaches the end of its path of travel in the "forward" direction, the rack forward microswitch 223 is actuated. Actuation of the rack forward microswitch 223 causes the ultrasonic transducer 231 to be energized. As a result, the tape lying between the tip of the transducer and the backup foot is vibrated. The vibration softens the tape layers located between the backup foot and the tip of the ultrasonic transducer and the pressure created by the backup foot bonds or welds the layers together. After a predetermined period of time, adequate for bonding to occur, the rack moves in the direction of the spool 111. As the rack returns toward the spool, the rod collar 203 is impinged on by the actuating block 209. This action causes the tape to be cut and the pin 191 attached to the movable jaw 67 to be moved toward the circular aperture defined by the clamshell assembly. As a result, the jaw is opened. At the same time, the short leg of the backup foot is moved away from the transducer tip, because the protrusion 169 attached to the backup foot is pushed toward the circular aperture, as previously described. When an appropriate position is reached, the backup foot lever arm rotates downwardly and the backup foot is latched. As these actions occur, the ramp cam is pushing the bevelled end of the rod 193 outwardly. When the collar is pushed outwardly far enough, the rod "snaps" forward. Forward rod motion stops when the collar reaches the shoulder 213 on the actuating block 209. At about this point, the rear end of the rack 57 impinges on the rack park microswitch 225 and rack motion stops. The tool is then moved slightly sidewise (toward the right) to remove the backup foot from the welded strap. Thereafter, another article can be moved into the open clamshell assembly, the trigger actuated and the sequence of operation repeated.

FIG. 9 is a schematic diagram of a control system suitable for controlling the operation of the tool illustrated in FIGS. 3–8. The control system illustrated in FIG. 9 includes: the trigger switch 107; the rack park switch 225; and the rack forward switch 223. In addition, FIG. 9 includes: the tape drive motor 141 designated M1; and, the rack drive motor 47 designated M2. Further, FIG. 9 includes: six relays designated R1, R2, R3, R4, R5 and R6; two timers designated T1 and T2; and, a red weld light designated L. R1 controls two sets of normally open contacts designated R1-K1 and R1-K2 and a set of normally closed contacts designated R2-K3; R2 controls two sets of normally open contacts designated R2-K1 and R2-K2 and a set of normally closed contacts designated R2-K3; and, R3 controls one set of normally closed contacts designated R3-K. R4 controls one set of normally open contacts designated R4-K; R5 controls three sets of normally open contacts designated R5-K1, R5-K2 and R5-K3 and three sets of normally closed contacts designated R5-K4, R5-K5 and R5-K6; and, R6 controls one set of normally closed contacts designated R6-K. T1 controls one set of normally closed contacts designated T1-K1 and one set of normally open contacts designated T1-K2. T2 controls one set of normally open contacts designated T2-K1 and one set of normally closed contacts designated T2-K2. The trigger switch 107 has a common terminal and two remote terminals. Similarly, the rack park switch and the rack forward switch each have a common terminal and two sets of remote terminals. The control circuit illustrated in FIG. 9 is energized by a suitable DC power supply. (Obviously, AC power converted to DC power by an AC to DC converter can be used, if desired.)

The positive terminal of the DC power source is connected through R1 to one of the remote terminals of the trigger switch. The other remote terminal of the trigger switch is unconnected. The trigger switch is actuated by the jaw closed lever arm 91 such that its movable element moves from the unconnected remote terminal to the remote terminal connected to R1 when the trigger 97 is pulled toward the rack drive motor. The common terminal of the trigger switch is connected to the negative terminal of the DC power supply. R3-K and R6-K are connected in parallel between the negative terminal of the power supply and one side of R1-K2. The other side of R1-K2 is connected to the junction between R1 and the related remote terminal of the trigger switch 107. The junction between R1 and the trigger switch 107 is also connected through R1-K1 to one side of T1 and one side of T1-K1. The other side of T1 is connected to the positive terminal of the power supply. The other side of T1-K1 is connected through M1 to the positive terminal of the power supply.

The other side of R1-K2, i.e., the side not connected through R3-K and R6-K to the negative terminal of the power supply, is connected to the common terminal of the rack park switch 225, the common terminal of the rack forward switch 223, and one side of R5-K1. One of the remote terminals of the rack park switch is unconnected. The other remote terminal of the rack park switch is connected through R3 to the positive side of the power supply. The same terminal of the rack park switch 225 is connected to one side of T1-K2. The other side of T1-K2 is connected through R2 to the positive terminal of the power supply. The rack park switch movable element is connected to the remote terminal connected to R3 and T1-K2 when the rack is in its part position. When the rack is away from its park position, the movable element of the rack park switch is connected to its unconnected remote terminal.

The junction between R2 and T1-K2 is connected through R2-K1 to one of the remote terminals of the rack forward switch 223. The other remote terminal of the rack forward switch 223 is connected to one side of T1-K2, one side of T2-K2, through T2 to the positive terminal of the voltage supply and through R6 to the positive terminal of the voltage supply. The rack forward switch moveable element is connected to the remote terminal connected to T2-K1, T2, R6 and T2-K2 when the rack is in its forward position. When the rack is away from its forward position, the movable element is connected to the remote terminal connected to R2-K1.

The other side of T2-K1 is connected through R5 to the positive terminal of the voltage supply and to the other side of K5-K1. The other side of T2-K2 is connected through R4 to the positive terminal of the voltage supply. R4-K is connected to the ultrasonic transducers power supply so as to cause the ultrasonic transducer to be actuated when R4-K (which is normally open) is closed. L is connected in parallel with R4, whereby L is lit when R4 is energized.

R2-K2 and R5-K2, R5-K3, R5-K4 and R5-K5 are connected to control the actuation of, and direction of current flow through, the rack drive motor M2. Because the direction of current flow is controlled, the direction of rotation of the shaft of the rack drive motor and, thus, the direction of movement of the rack is controlled by these contacts. More specifically, R5-K2 is connected between the positive terminal of a suitable DC power supply and one side of the rack drive motor. The same side of the rack drive motor is connected through R5-K5 to the negative terminal of the DC power supply. The other side of the rack drive motor is connected R5-K3 to the negative terminal of the DC power supply and through R5-K4 in series with R2-K2 to the positive terminal of the DC power supply.

R2-K3 and R5-K6 form a dynamic brake for M2. More specifically, R2-K3 and R5-K6 are connected in series and the series connection is connected in parallel with M2. Thus, when R2-K3 and R5-K6 are closed, they short current flow through M2 so as to bring M2 to an immediate stop.

In operation, when the trigger switch 107 is actuated, in the manner previously described, R1 is energized. As a result, R1-K1 and R1-K2 close. While R3 is energized when R1-K2 closes (via the park rack switch), whereby R3-K opens, since R6-K remains closed, power remains supplied to R1 (through R1-K2 and R6-K) even though the trigger switch 107 opens, as a result of the trigger being released.

T1 is energized when R1-K1 closes. T1 controls the duration of the tape drive motor energization cycle. Specifically, when R1 is energized and R1-K1 close, T1 starts to time out. While T1 is timing out power is applied via T1-K1 to the tape drive motor. After T1 times out, T1-K1 opens and the tape drive motor power ends, whereby tape movement stops. The T1 time is adequate for the desired number of spiral tape wraps to be formed.

At the end of the T1 time-out period, T1-K2 close. As a result, R2 is energized. When R2 is energized, R2-K1 and R2-K2 close and R2-K3 opens. When R2-K2 close, power is applied to the rack drive motor through R2-K2, R5-K4, and R5-K5. (Since R2-K3 is open, the dynamic brake does not shunt current around the drive motor.) When the rack starts to move, the rack park switch opens. However, because the rack forward switch remains closed power is still applied to R2, via R2-K1. When the rack park switch 225 opens, the power applied to R3 is terminated. As a result, R3-K close. As will be better understood from the following discussion, this closure maintains the supply of power to R1 (via R1-K2), when R6-K open.

When the rack reaches its forwardmost position, the rack forward switch is actuated and the power applied to R2 terminates, whereby the power applied to the rack drive motor in the forward direction ends (because R2-K2 open). At the same time R2-K3 closes and the rack drive motor is dynamically braked to an immediate stop. When the rack forward switch 223 is actuated, T2 is energized. T2 is a timer that controls the time that power is applied to the ultrasonic transducer. More specifically, when the movable element of the rack forward switch moves to its "rack forward" position and power is applied to T2, power is also applied through T2-K2 to R4. As a result, R4-K close and power is applied to the ultrasonic transducer. At the end of the T2 time period, T2-K2 open, whereby R4 becomes de-energized and R4-K open to terminate the application of power to the ultrasonic transducer.

When T2 times out, T2-K1 closes, whereby power is applied to R5. The power applied to R5 closes R5-K1, R5-K2 and R5-K3. At the time, R5-K4, R5-K5 and R5-K6 open. Because R5-K2 and R5-K3 are closed, current is applied to the rack drive motor in the opposite direction. (Again, the opening of R5-K6 prevents the dynamic brake from shunting current around the rack drive motor.) As a result, the rack drive motor starts to move the rack back to its park position. Power remains applied to R5 even though the rack forward switch movable element returns to its normal position, because R5-K1 are closed. During return movement of the rack, R6 is energized via T2-K1 (and R5-K1). As a result, R6-K open. R3-K, however, remain closed because R3 is deenergized. When the rack reaches its park position, however, R3 becomes energized. As a result, R3-K as well as R6-K are now open. Because both R3-K and R6-K are open, the application of power to R1, R3 and R5 terminates. Because R5 is de-energized power to the rack drive motor stops and the dynamic brake brings the motor to an immediate stop. Consequently, the entire circuit is reset and ready for the next cycle of operation, which occurs when the trigger switch is again actuated.

It will be appreciated from the foregoing description that the invention provides an ultrasonic tape tie strapping method and apparatus that contemplates wrapping at least one and preferably two or more spiral layers of a tape around an article such as a bundle of electrical wires. The strap is automatically tightened and bonded to prevent its being loosened. The bond or weld is formed in such a manner that no knob or protrusion results after the strap is cut and the strap and article are removed from the tool. While thermoplastics, such as a polyester coated with a polyamide, which are readily softened by ultrasonic vibration of adjacent layers and bonded by pressure, is the preferred tape material, other materials can be utilized if an adequate amount of heat can be produced by ultrasonic vibration of adjacent tape layers and bonding can be accomplished by backup foot pressure. In this regard, rather than the tape material bonding or welding together, the tape could be coated with an adhesive that bonds when ultrasonic force vibrates adjacent layers of tape pressed against the tip of an ultrasonic transducer. Further, in some environments, it may be desirable to use a metal tape rather than a plastic tape.

As noted above, while the invention has been described for use in wrapping a strap around a bundle of wires, it can also be used in other environments. For example, a substantially larger embodiment of the invention can be used to strap other, larger types of elongate objects together. Also, the article need not be objects that are circular in cross-sectional configuration. Further, the objects can be dissimilar. Moreover, a single article can be strapped. Consequently, the invention can be practiced otherwise than as specifically described herein.

The embodiments of the invention in which an exclusive property or privilege is claimed are defined as follows:

1. A method of circumferentially applying strapping tape, bondable by heat and pressure when overlapped, around an article comprising the steps of:

guiding at least one tape convolution around said article and a backup foot such that said convolution includes a region of tape overlap located adjacent to said backup foot;

tightening said at least one tape convolution about said article and said backup foot;

moving said backup foot towards the tip of an ultrasonic transducer;

ultrasonically and transversely vibrating the tip of said ultrasonic transducer against said tape overlap region so as to heat said tape overlap region;

simultaneously with said step of ultrasonically vibrating said tape, pressing with said backup foot said tape overlap region against the tip of said ultrasonic transducer so as to bond together the layers of tape in said tape overlap region;

cutting the bonded tape convolution free in a region immediately adjacent to said bond; and, removing the backup foot from the bonded tape convolution.

2. The method of circumferentially applying strapping tape claimed in claim 1 including the step of obtaining said tape from a source of tape of indeterminate length.

3. The method of circumferentially applying strapping tape claimed in claim 2 wherein said tape guided around said article and said backup foot is drawn from a reserve loop and wherein a new reserve loop is formed during said tape tightening step.

4. The method of circumferentially applying strapping tape claimed in claim 3 wherein the step of guiding at least one tape convolution comprises the substeps of: closing a clamshell around said article and said backup foot; and directing said tape through a path of travel defined by said clamshell.

5. The method of circumferentially applying strapping tape claimed in claim 1 wherein said tape wrapped around said article and said backup foot is drawn from a reserve loop and wherein a new reserve loop is formed during said tape tightening step.

6. The method of circumferentially applying strapping tape claimed in claim 1 wherein two or more tape convolutions are guided around said article and said backup foot and wherein said convolutions include three or more layers of tape overlap located adjacent to said backup foot.

7. The method of circumferentially applying strapping tape as claimed in claim 6 wherein said tape wrapped around said article is drawn from a reserve loop and wherein a new reserve loop is formed during said tape tightening step.

8. The method of circumferentially applying strapping tape claimed in claim 1 wherein the step of guiding at least one tape convolution comprises the substeps of: closing a clamshell around said article and said backup foot; and directing said tape through a path of travel defined by said clamshell.

9. Apparatus for circumferentially applying strapping tape, bondable together by heat and pressure when layered, around an article comprising:

(a) ultrasonic transducer means including a horn having a tip defining a first contact surface and vibrating means for vibrating said horn along a vibration axis passing through said horn and said tip;

(b) a backup foot defining a second tape contact surface of substantially the same size as said first tape contact surface, said second tape contact surface lying along said vibration axis and aligned with said first tape contact surface;

(c) wrapping means for spirally wrapping at least one tape convolution around said article and said backup foot such that a region of tape overlap is formed in said at least one tape convolution between said first and second tape contact surfaces;

(d) tightening means for tightening said tape convolution about said article and said backup foot;

(e) backup foot control means for applying pressure to said backup foot in a manner such that said backup foot presses said overlapping layers of tape lying between said first and second tape contact surfaces against the tip of said ultrasonic transducer when said ultrasonic transducer vibrates said tape; and, (f) cutting means for cutting said tape at a point between said tightening means and said ultrasonic transducer means, adjacent to said tip of said horn of said ultrasonic transducer means.

10. Apparatus for circumferentially applying strapping tape as claimed in claim 9 including tape supply means for supplying tape to said wrapping means, said tape supply means containing tape of indeterminate length.

11. Apparatus for circumferentially applying strapping tape as claimed in claim 10 wherein said wrapping means includes a clamshell assembly having a movable jaw and a fixed jaw, said movable and fixed jaws defining a circular aperture within which said backup foot is located, said movable and fixed jaws including guide means for guiding said tape along a path of travel around said circular aperture so as to form said at least one tape convolution around an article located in said circular aperture and said backup foot.

12. Apparatus for circumferentially applying strapping tape as claimed in claim 11 wherein said wrapping means further includes tape moving means for moving said tape along said path of travel formed by said guide means.

13. Apparatus for circumferentially applying strapping tape as claimed in claim 12 wherein said guide means is formed by a channel formed in the periphery of said circular aperture.

14. Apparatus for circumferentially applying strapping tape as claimed in claim 13 wherein said wrapping means includes jaw closure means for closing the movable jaw of said clamshell assembly.

15. Apparatus for circumferentially applying strapping tape as claimed in claim 14 wherein said tape moving means includes electric motor means for linearly moving said tape.

16. Apparatus for circumferentially applying strapping tape as claimed in claim 15 wherein said tightening means comprises a rack having a plunger formed on one end, said plunger adapted to impinge on said tape between said tape supply means and said clamshell assembly, said rack being moved after said tape is wrapped around said article and said backup foot so as to pull tape away from said clamshell assembly and, thereby, tighten said tape around said article and said backup foot.

17. Apparatus for circumferentially applying strapping tape as claimed in claim 14 wherein said rack continues to move said tape after said tape is tightened about said article and said backup foot, said further movement drawing tape from said tape supply means.

18. Apparatus for circumferentially applying strapping tape as claimed in claim 17 wherein said rack returns to a park position after said tape layers have been bonded together, said return of said rack to said park position creating a reserve loop.

19. Apparatus for circumferentially applying strapping tape as claimed in claim 18 including a tension brake located between said tape supply means and said rack.

20. Appartus for circumferentially applying strapping tape as claimed in claim 19 wherein said tape supply means includes a tape spool containing tape of indeterminate length; and, including a tangle control brake connected to said tape spool for preventing the free wheeling of said tape spool.

21. Apparatus for circumferentially applying strapping tape as claimed in claim 10 wherein said tightening means comprises a rack having a plunger formed on one end, said plunger adapted to impinge on said tape between said tape supply means and said wrapping means, said rack being moved after said tape is wrapped around said article and said backup foot so as to pull tape away form said wrapping means and, thereby, tighten said tape around said article and said backup foot.

22. Apparatus for circumferentially applying strapping tape as claimed in claim 21 wherein said rack continues to move said tape after said tape is tightened about said article and said backup foot, said further movement drawing tape from said tape supply means.

23. Apparatus for circumferentially applying strapping tape as claimed in claim 22 wherein said rack returns to a park position after said tape layers have been bonded together, said return of said rack to said park position creating a reserve loop.

24. Apparatus for circumferentially applying strapping tape as claimed in claim 23 wherein two or more tape convolutions are spirally wrapped about said article and said backup foot and wherein said spiral convolutions include three or more layers of tape overlap located between said first and second tape contact surfaces.

25. Apparatus for circumferentially applying strapping tape as claimed in claim 23 including a tension brake located between said rack supply means and said rack.

26. Apparatus for circumferentially applying strapping tape as claimed in claim 10 wherein said tape supply means includes a tape spool containing tape of indeterminate length; and, including a tangle control brake connected to said tape spool for preventing the free wheeling of said tape spool.

27. Apparatus for circumferentially applying strapping tape as claimed in claim 10 including a tension brake located between said tape supply means and said tape tightening means.

28. Apparatus for circumferentially applying strapping tape as claimed in claim 9 wherein said wrapping means includes a clamshell assembly having a movable jaw and a fixed jaw, said movable and fixed jaws defining a circular aperture within which said backup foot is located, said movable and fixed jaws including guide means for guiding said tape along a path of travel around said circular aperture so as to form said at least one tape convolution around an article located in said circular aperture and said backup foot.

29. Apparatus for circumferentially applying strapping tape as claimed in claim 28 wherein said wrapping means further includes tape moving means for moving said tape along said path of travel formed by said guide means.

30. Apparatus for circumferentially applying strapping tape as claimed in claim 29 wherein said guide means is formed by a channel formed in the periphery of said circular aperture.

31. Apparatus for circumferentially applying strapping tape as claimed in claim 30 wherein said tape moving means includes electric motor means for linearly moving said tape.

32. Apparatus for circumferentially applying strapping tape as claimed in claim 28 wherein said wrapping means includes jaw closure means for closing the movable jaw of said clamshell assembly.

33. A tool for applying strapping tape circumferentially around a plurality of elongate objects, such as wires, said tape being bondable together by heat and pressure when layered, said tool comprising:
   an elongate frame means;
   a clamshell assembly located at one end of said frame means, said clamshell assembly including a fixed jaw and a movable jaw, said movable jaw being movable between an open position and a closed position, said fixed and movable jaws defining a circular aperture when said movable jaw is in said closed position, said fixed and movable jaws including guiding means for guiding tape around the periphery of said circular aperture;
   a tape storage means for storing tape of indeterminate lengh located at the other end of said frame means;
   tape moving means for moving tape along a path of travel generally defined by said frame means from said tape storage means to said clamshell assembly wherein said tape is guided by said guiding means around said circular aperture;
   ultrasonic transducer means including: an ultrasonic horn mounted in said elongate frame means, said ultrasonic horn having a tip, said tip located along the periphery of said circular aperture and defining a first tape contact surface; and, vibration means for vibrating said horn along a vibration axis passing through said ultrasonic horn and said tip;
   a backup foot located in said circular aperture and defining a second tape contact surface of substantially the same size as said first tape contact surface, said second tape contact surface lying along said vibration axis and aligned with said first tape contact surface;
   tape tightening means located between said circular aperture and said tape supply means for pulling tape from said circular aperture after said tape has been guided around the periphery of said circular aperture so as to tighten said tape about said backup foot and a plurality of elongate objects located in said circular aperture such that at least two layers of tape are formed between said first and second tape contact surfaces;

said ultrasonic transducer means vibrating said tape in the region of said backup foot such that said tape is heated;

pressure means for pressing said backup foot against said tip of said horn of said ultrasonic transducer means during the period of time said ultrasonic transducer means vibrates said tape in the region of said backup foot whereby said at least two layers of tape lying between said first and second tape contact surfaces are pressed against said tip of said ultrasonic horn by said backup foot; and, cutting means located between said tape tighening means and said clamshell assembly for cutting said tape adjacent said backup foot and said tip of said ultrasonic horn.

34. A tool for applying strapping tape as claimed in claim 33 wherein said tape storage means is a spool of tape of indeterminate length.

35. A tool for applying strapping tape as claimed in claim 34 wherein said ultrasonic horn is elongate and vibrates longitudinally.

36. A tool for applying strapping tape as claimed in claim 35 wherein said tape tightening means comprises:
a rack having a plunger on one end;
a bidirectional rack drive motor means for moving said rack, said plunger adapted to impinge on said tape and pull said tape away from said circular aperture when said rack is moved in one direction from a park position so as to tighten said tape.

37. A tool for applying strapping tape as claimed in claim 36 wherein said rack continues to move said plunger against said tape after said tape is tightened about said plurality of elongate objects and said backup foot, said continued movement of said plunger pulling tape from said spool of tape.

38. Apparatus for circumferentially applying strapping tape as claimed in claim 33 wherein two or more tape convolutions are spirally wrapped about said article and said backup foot and wherein said spiral convolutions include three or more layers of tape overlap located between said first and second tape contact surfaces.

39. A tool for applying strapping tape as claimed in claim 37 including a tape tension brake located between said rack and said spool of tape.

40. A tool for applying strapping tape as claimed in claim 39 including a trigger, said trigger connected to said movable jaw of said clamshell assembly so as to close said movable jaw of said clamshell assembly when said trigger is moved in a predetermined direction.

41. A tool for applying strapping tape as claimed in claim 40 including jaw opening means connected to said rack such that said jaw opening means opens said movable jaw of said clamshell assembly when said rack is moved toward its park position.

42. A tool for applying strapping tape as claimed in claim 23 including backup foot latching means connected to said jaw opening means such that said backup foot is latched by said jaw opening means when said jaw is opened by said jaw opening means.

43. A tool for applying strapping tape as claimed in claim 42 wherein said jaw opening means further includes a backup foot releasing mechanism for releasing said backup foot from said latched position immediately prior to said plunger tightening said tape.

44. A tool for applying strapping tape as claimed in claim 33 wherein said ultrasonic horn is elongate and vibrates longitudinally.

45. A tool for applying strapping tape as claimed in claim 33 wherein said tape tightening means comprises:
a rack having a plunger on one end;
a bidirectional rack drive motor means for moving said rack, said plunger adapted to impinge on said tape and pull said tape away from said circular aperture when said rack is moved in one direction from a park position so as to tighten said tape.

46. A tool for applying strapping tape as claimed in claim 45 wherein said rack continues to move said plunger against said tape after said tape is tightened about said plurality of elongate objects and said backup foot, said continued movement of said plunger pulling tape from said tape storage means.

47. A tool for applying strapping tape as claimed in claim 37 wherein said rack returns to a park position after said tape layers have been bonded together, said return of said rack to said park position creating a reserve loop.

48. A tool for applying strapping tape as claimed in claim 46 wherein said rack returns to a park position after said tape layers have been bonded together, said return of said rack to said park position creating a reserve loop.

49. A tool for applying strapping tape as claimed in claim 46 including a tape tension brake located between said rack and said tape storage means.

50. A tool for applying strapping tape as claimed in claim 49 including jaw opening means connected to said rack such that said jaw opening means opens said movable jaw of said clamshell assembly when said rack is moved toward its park position.

51. A tool for applying strapping tape as claimed in claim 50 including backup foot latching means connected to said jaw opening means such that said backup foot is latched by said jaw opening means when said jaw is opened by said jaw opening means.

52. A tool for applying strapping tape as claimed in claim 51 wherein said jaw opening means further includes a backup foot releasing mechanism for releasing said backup foot from said latched position immediately prior to said plunger tightening said tape.

53. A tool for applying strapping tape as claimed in claim 33 including a tape tension brake located between said tape tightening means and said tape storage means.

54. A tool for applying strapping tape as claimed in claim 33 including a trigger, said trigger connected to said movable jaw of said clamshell assembly so as to close said movable jaw of said clamshell assembly when said trigger is moved in a predetermined direction.

55. A tool for applying strapping tape as claimed in claim 33 including jaw opening means for opening said movable jaw of said clamshell assembly.

56. A tool for applying strapping tape as claimed in claim 55 including backup foot latching means connected to said jaw opening means such that said backup foot is latched by said jaw opening means when said jaw is opened by said jaw opening means.

57. A tool for applying strapping tape as claimed in claim 56 wherein said jaw opening means further includes a backup foot releasing mechanism for releasing said backup foot from said latched position immediately prior to said tape tightening means tightening said tape.

* * * * *